(12) United States Patent
Mintova et al.

(10) Patent No.: US 11,655,158 B2
(45) Date of Patent: May 23, 2023

(54) ISOMORPHOUS SUBSTITUTION OF METALS DURING THE SYNTHESIS OF A ZEOLITE FRAMEWORK

(71) Applicants: TotalEnergies OneTech, Courbevoie (FR); CENTRE NATIONAL DE LA RECHERCHE SCIENTIFIQUE (CNRS), Paris (FR)

(72) Inventors: Svetlana Mintova, Basly (FR); Jean-Pierre Gilson, Fouesnant (FR); Nikolai Nesterenko, Nivelles (BE); Delphine Minoux, Nivelles (BE); Cindy Aquino, Watermael-Boitsfort (BE); Julien Grand, Viroflay (FR); Florent Dubray, Caen (FR)

(73) Assignees: TOTALENERGIES ONETECH, Courbevoie (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 17/768,391

(22) PCT Filed: Oct. 13, 2020

(86) PCT No.: PCT/EP2020/078770
§ 371 (c)(1),
(2) Date: Apr. 12, 2022

(87) PCT Pub. No.: WO2021/074144
PCT Pub. Date: Apr. 22, 2021

(65) Prior Publication Data
US 2022/0363556 A1   Nov. 17, 2022

(30) Foreign Application Priority Data

Oct. 14, 2019   (EP) ..................................... 19315122

(51) Int. Cl.
C01B 39/48   (2006.01)
(52) U.S. Cl.
CPC .......... C01B 39/48 (2013.01); *C01P 2002/72* (2013.01); *C01P 2002/82* (2013.01);
(Continued)

(58) Field of Classification Search
CPC ..................................................... C01B 39/48
See application file for complete search history.

(56) References Cited

FOREIGN PATENT DOCUMENTS

| EP | 3178788 A1 | 6/2017 |
|---|---|---|
| WO | 9733830 A1 | 9/1997 |

(Continued)

OTHER PUBLICATIONS

R.M. Barrer, "Hydrothermal Chemistry of Zeolites", 1982, Academic Press, London.
(Continued)

*Primary Examiner* — James A Fiorito
(74) *Attorney, Agent, or Firm* — Ewing & Jones, PLLC

(57) ABSTRACT

The present disclosure relates to a novel staged-synthesis method for introduction of various metals in the structure of zeolite frameworks by isomorphous substitution. This new method is based on a hydrothermal synthesis in which the metal addition to the precursor suspensions (gel) is delayed. This so-called "staged-synthesis method" allows to obtain nanosized silanol highly homo-geneous crystalline zeolite structures with a control of the metal location.

20 Claims, 7 Drawing Sheets

(52) U.S. Cl.
CPC ...... *C01P 2002/85* (2013.01); *C01P 2002/86* (2013.01); *C01P 2004/03* (2013.01); *C01P 2004/04* (2013.01); *C01P 2006/12* (2013.01); *C01P 2006/14* (2013.01)

(56) References Cited

FOREIGN PATENT DOCUMENTS

| WO | 2009077086 A1 | 6/2009 |
|---|---|---|
| WO | 2017068387 A1 | 4/2017 |

OTHER PUBLICATIONS

S. Tolborg et al., "Incorporation of tin affects crystallization, morphology, and crystal composition of Sn-Beta†"; J. Mat. Chem. A., 2014, 2, 20252-20262.

N.P. Van Der Graaff et al., "Synthesis of Sn-Beta with Exclusive and High Framework Sn Content"; Chem. Cat. Chem., 2015, 10 pages.

N. Garcia Vargas et al., "Synthesis and characterization of tin(IV) MFI: Sodium inhibits the synthesis of phase pure materials"; Microporous and Mesoporous Materials, 152 (2012) 37-49.

Yong Sig Ko et al., "Synthesis and Characterization of Zirconium Silicalite-1"; Korean J. Chem. Eng. 15(4), 423-428 (1998).

J. Grand et al., "One-pot synthesis of silanol-free nanosized MFI zeolite"; Nature Materials (2017) 16, 1010-1015.

F. Dubray et al., "Direct Evidence for Single Molybdenum Atoms Incorporated in the Framework of MFI Zeolite Nanocrystals"; J. Am. Chem. Soc. 141 (2019) 8689-8693.

Baorong Wang et al., "Nano-crystalline, hierarchical zeolite Ti-Beta: Hydrothermal synthesis and catalytic performance in alkenes epoxidation reactions", Microporous and Mesoporous Materials, Amsterdam, NL, (Nov. 14, 2018), vol. 278, pp. 30-34.

J. Kornatowski et al., "Spectroscopic Studies of Vanadium-Substituted Zeolitic Silicates of MFI Topology", Journal of the Chemical Society, Faraday Transactions, Royal Society of Chemistry, Cambridge,GB, (Mar. 21, 1996), vol. 92, No. 6, pp. 1067-1078.

Naser Hadi et al., "Selective production of propylene from methanol over nanosheets of metal-substituted MFI zeolites", Journal of Industrial and Engineering Chemistry, The Korean Society of Industrial and Engineering Chemistry, Korea, (2017), vol. 54, 16 pages.

Lichen Liu et al., "Regioselective generation and reactivity control of subnanometric platinum clusters in zeolites for high-temperature catalysis", Nature Materials, Nature Publishing Group, GB, vol. 18, No. 8, (Aug. 30, 2019), pp. 866-873.

International Search Report and Written Opinion issued in Application No. PCT/EP2020/078770, dated Jan. 14, 2021; 11 pages.

ISOMORPHOUS SUBSTITUTION OF METALS DURING THE SYNTHESIS OF A ZEOLITE FRAMEWORK

CROSS-REFERENCE TO RELATED APPLICATIONS

This application claims the benefit of PCT/EP2020/078770 filed Oct. 13, 2020, which claims priority from EP 19315122.2 filed Oct. 14, 2019, which are incorporated herein by reference in their entireties for all purposes.

FIELD OF THE DISCLOSURE

The present disclosure relates to a novel staged-synthesis method for the introduction of various metals in the structure of zeolite frameworks by isomorphous substitution. This new method is based on a hydrothermal synthesis in which the metal addition to the precursor suspensions (gel) is delayed. This so-called "staged-synthesis method" allows obtaining nanosized silanol highly homogeneous crystalline zeolite structures with control of the metal location.

BACKGROUND OF THE DISCLOSURE

Zeolites are structurally complex inorganic polymers with a three-dimensional crystalline skeleton of $TO_4$ tetrahedral. The centre of the tetrahedral is generally a silicon or aluminium atom, which corresponds to a $SiO_4$ and $AlO_4$ tetrahedron respectively. These tetrahedral are connected to each other by common oxygen atoms. The complete structure forms a three-dimensional network, exhibiting some micropores, cages and channels. They have a demonstrated track record in many applications such as catalysis, separation and ion exchange due to their unique properties of acidic molecular sieves. In the past decades, many efforts have been devoted to tuning zeolite properties such as acidity and redox potential in order to improve their performances. Such modification of zeolite acidity and redox properties is usually performed through the introduction of transition metal atoms. The resulting properties of the material will then highly depend on the nature of the metal species introduced in the zeolite, depending itself on the way the metal was introduced in the first place.

Two main groups of metal species exist in zeolites: (i) non-framework metal species and (ii) framework metal species. Non-framework metal species are sitting in non-framework positions of the zeolite structure. On the other hand, framework metal stands for metal introduced in crystallographic tetrahedral positions from the zeolite framework thanks to a procedure called isomorphous substitution. Isomorphous substitution is a procedure allowing to replace one silicon atom from the zeolite framework with any other given elements.

Isomorphous substitution can be performed using two main approaches: (i) direct hydrothermal synthesis or (ii) post-synthesis approach. The direct synthesis approach (i) corresponds to the direct introduction of metal source within the precursor suspension (gel) prior to crystallization. The presence of metallic species in the precursors then allows replacing part of silica by other metals during the crystallization process, thus, achieving isomorphous substitution. However, the presence of metallic species in the precursor suspension (gel) is not to be considered lightly, as it can influence strongly the nucleation and crystallization process as described for the synthesis of Sn-BEA zeolite by S. Tolborg et al. [J. Mat. Chem. A., 2014, 2, 20252-20262]. Similarly, a lot of silanols can still be observed in Sn-BEA zeolite after Sn introduction in the work from N. P. Van Der Graaff [Chem. Cat. Chem., 2015, 7, 1152-1160].

N. Garcia Vargas et al. in Microporous and Mesoporous Materials 152 (2012) 37-49 reported the preparation of tin (IV) MFI where the presence of sodium hydroxide makes it difficult to have a pure Sn-MFI material.

Yong Sig Ko et al. in Korean J. Chem. Eng. 15(4), 423-428 (1998) reported the preparation of zirconium silicalite-1 (ZS-1) prepared via hydrothermal synthesis method where the zirconium precursor is incorporated directly into the zeolite precursor gel.

Similarly, WO2017/068387 A1 reported a method for the preparation of nanosized synthetic zeolite wherein the metal is incorporated in a clear solution containing the other components of the zeolite i.e. before any crystallisation of the zeolite.

In WO97/33830 A1 is described the direct hydrothermal synthesis of zeolite Ti-Beta in absence of aluminium, using hydrofluoric acid (HF) in the absence of seeds, by hydrolyzing a mixture of tetraethyl orthosilicate, tetraethylammonium hydroxide, water, hydrogen peroxide; adding tetraethyl orthotitanate to the resulting suspension, and pursuing hydrolysis; evaporating off the ethanol; adding HF to the resulting mixture; and heating in an autoclave at 140° C. for 11 days. Such preparation of zeolite in the presence of fluoride anions leads to the formation of large crystals; the high toxicity of HF and the difficulties it brings when scaled-up have to be taken into consideration.

Many efforts were devoted to the reduction of crystal size in order to reduce diffusion limitations for catalysis applications. Thus, nano-sized zeolitic materials were prepared, but only 18 from the 229 structure types available could be synthesized into nano-sized dimensions up to date. Such synthesis usually involves alkaline conditions, preventing the use of fluoride anion as a crystallization mediating agent. Indeed, synthesis performed in the presence of fluoride anion tends to form large crystals.

As a consequence, there is still a need for reliable methods to introduce metals in the zeolite framework under alkaline conditions to prepare nanosized metal-containing zeolites, i.e. synthetic zeolite material. There is still a need for a method allowing better-controlled nucleation and crystallization step to controlling correctly the crystal size and morphology of the zeolite, together with a control of the radial distribution of metallic species introduced in the zeolite framework by isomorphous substitution. There is a need of a method allowing the preparation of nanosized metal-containing zeolites that is practical and safe. There is a need of a method allowing the preparation of nanosized metal-containing zeolites that is fast. There is a need for a method to produce with proved properties in hydrophobicity, colloidal stability and/or thermal resistance. Finally, there is still a need for a method that allows producing zeolite with high crystallinity and with high ordering and homogeneity.

SUMMARY OF THE DISCLOSURE

The aim of the present disclosure is to overcome the above-mentioned drawbacks and to provide a simple and economic preparation method leading from commonly used initial reagents to a synthetic zeolite material.

According to a first aspect, the disclosure relates to a method for the preparation of a synthetic zeolite material, containing at least one metal M selected from W, V, Mo, Nb, Sn, Zr, Ag, Co, Ni, Cu, Ti, In and Zn or any mixture thereof with silicon to metal M molar ratio Si/M ranging from 117 to 65440 as determined by inductively coupled plasma optical emission spectrometry, wherein said method comprises the following steps:

a) contacting at least one source of silicon, at least one tetraalkylammonium hydroxide structure-directing agent, TAAOH, and water, so as to obtain an aqueous suspension having the following molar composition (I):

$$1SiO_2 : y\ TAA_2O : z\ H_2O$$

in which:
$0.04 < y < 0.40$, and more preferably $0.2 < y < 0.3$,
$8 < z < 120$, and more preferably $20 < z < 50$.

b) ageing during a time ranging between 1 h and 100 h the resulting clear suspension from step a) at a temperature ranging from 10° C. to 50° C., preferably 10 to 35° C.;

c) heating for at least 30 min the clear suspension of step b) at a temperature ranging from 40° C. to 180° C., preferably at a temperature ranging from 60° C. to 120° C.;

d) cooling the solution obtained at step c) to 20° C. and adding at least one source of alkali metal M' selected from a lithium, sodium, potassium, or caesium salt of a metal M, to obtain a gel having the molar composition (II):

$$xM_nO_m : 1SiO_2 : y\ TAA_2O : w\ M'_2O : z\ H_2O$$

In which: the M'/M ratio varies from 0.1 to 4
$0.04 < y < 0.40$, and more preferably $0.2 < y < 0.3$,
$8 < z < 120$, and more preferably $20 < z < 80$ or $20 < z < 50$ or $30 < z < 50$
$0.0004 < x < 0.15$, and preferably $0.01 < x < 0.1$ or $0.05 < x < 0.1$,
$0.0004 < w < 0.30$, and more preferably $0.01 < w < 0.2$ or $0.05 < w < 0.2$,
n is an integer equal to 1 or 2, and
m is an integer and $1 < m < 6$;

e) ageing said gel obtained at step d) at a temperature ranging from 10° C. to 35° C. for at least 30 min f) heating the solution obtained at step e) at a temperature ranging from 40° C. to 180° C., for at least 12 h and at most 96 h g) separating the solid from said liquid obtained at step f)

h) calcining said solid obtained at step g) under autogenous pressure with a relative humidity of 50 to 80% to obtain said synthetic zeolite material.

With preference, the source of the alkali metal M' is a sodium or a potassium salt of the metal M.

The method of the present disclosure presents the advantage that the metal M suppresses the defects being the silanols and silanol nests. The defects are saturated with metal coordinated with 4 or 2 Si (T-atoms) with oxygen bridges depending on its coordination stage. Once saturated with the metals, said synthetic zeolite material present useful properties such as hydrophobicity, colloidal stability, and thermal resistance.

The method of the present disclosure allows fine control of nucleation stage [step a) and b)] in the absence of the metal M, and of the crystallization steps [step c) and f)]. Such control of the synthesis method allows to finely tune crystal size based on the enhanced control of the nucleation step. The possibility to conduct the nucleation step in absence of metal M at stage [steps a) and b)] prevents the interaction of said metal M at the nucleation stage. Consequently, the synthetic zeolite material obtained has a similar particle size, particle size distribution, and morphology as the purely-siliceous zeolite that would be obtained without steps d), e), and f). As a consequence, the method does not require space confiners to limit the growth of crystals. Additionally, without willing to be bound to any theory, it is believed that the method of the disclosure allows controlling the radial distribution of said metal M in the zeolitic material. The metal M is introduced in step d) at an early stage of nucleation i.e. after the heating of step c). In this case, the defects are homogeneously distributed in the material produced. This allows a homogeneous radial distribution of metal M in the synthetic zeolite material.

The present method of preparation is also advantaging in that the starting materials used in the synthesis are those commonly used in the commercial production of zeolites. In comparison with the prior art, there is no need of a fluoride-based agent. This is particularly advantaging for practical and safety reasons. The method using an alkaline mediating agent instead of fluoride, the nucleation step is faster. This avoids the formation of large crystals that are otherwise formed when using fluoride mediating agent, where a slower nucleation rate is observed.

Advantageously, the silicon to metal M molar ratio Si/M is ranging from 179 to 65440 as determined by inductively coupled plasma optical emission spectrometry.

For example, thecross-polarization spectra $\{^1H\}$ $^{29}Si$ CP MAS NMR of said synthetic zeolite material presents no peak. This indicates the absence of silanol species (i.e. defects) in the zeolite.

According to a preferred embodiment of the disclosure, the synthetic zeolite material has an MFI-, BEA-, or FAU-framework type; preferably, the synthetic zeolite material has a BEA or an MFI framework type, more preferably an MFI framework type.

With preference, whatever is the framework type of the synthetic zeolite material, one or more of the following embodiments can be used to better define the synthetic zeolite material The synthetic zeolite material has the form of monodispersed single nanocrystals having a size ranging from 10 to 800 nm, preferably from 10 to 400 nm or from 100 to 800 nm measured by scanning electron microscopy (SEM).

The metal M is selected from W, V, Mo, Sn, Zr, Ag, Co, Ni, Cu, Ti, In and Zn or any mixture thereof; preferably selected from W, V, Mo, Sn, Zr, Co, Ni, Cu, Ti, In, Zn and any mixture thereof; more preferably selected from W, V, Mo, Sn, Zr, Ni, Cu, Ti, and any mixture thereof; even more preferably selected from W, V, Mo, Sn, Zr and any mixture thereof; most preferably Mo, Sn and V or any mixture thereof; and even most preferably is or comprises Mo; or is or comprises Sn; is or comprises V.

The synthetic zeolite material has a silicon to metal M molar ratio Si/M is ranging from 179 to 65440 as determined by inductively coupled plasma optical emission spectrometry; preferably ranging from 438 to 1752.

The synthetic zeolite material has a silicon to metal M molar ratio Si/M of at least 179, preferably of at least 200, or at least 240, or at least 250.

The synthetic zeolite material has a silicon to metal M molar ratio Si/M of at most 1800; or at most 1752; or at most 1500.

The synthetic zeolite material has a specific surface area ranging from about 300 to 500 $m^2/g$ measured according to BET method ASTM D3663-03.

The synthetic zeolite material has a pore volume of about 0.2 to 0.7 $cm^3/g$ measured according to BET method ASTM D3663-03.

The synthetic zeolite material has an external surface area of about 20 to 190 m²/g measured according to BET method ASTM D3663-03.

The synthetic zeolite material contains a metal M with a content of 0.1 to 1.5 wt. % at most, with respect to the total mass of the material measured according to Energy-dispersive spectroscopy—Transmission Electron Microscopy, EDS-TEM; preferably ranging from 0.3 to 1.2 wt. %; and more preferably ranging from 0.4 to 1.0 wt. %; or ranging from 0.5 to 0.8 wt. %.

The synthetic zeolite material comprises no aluminium, so that the Si/Al molar ratio is infinite.

The metal-containing synthetic zeolite material has an average crystal size ranging from 10 to 800 nm preferably from 10 to 600 nm or from 100 to 800 nm measured by scanning electron microscopy (SEM).

The metal-containing synthetic zeolite material has dispersed nanocrystals.

With preference, whatever is the framework type of the synthetic zeolite material, one or more of the following embodiments can be used to better define the method:

The source of silicon is selected from silica hydrogel, silicic acid, colloidal silica, fumed silica, tetraalkyl orthosilicates, silica hydroxides, precipitated silica and sodium silicates.

The addition of alkali metal M' and of said metal M at step d) are performed simultaneously and preferably the source of M and M' is a sodium or a potassium salt of the metal M, more preferably the source of M and M' is $Na_2WO_4 \cdot 2H_2O$, $K_2WO_4$, $NaVO_3$, $KVO_3$, $Na_2MoO_4 \cdot 2H_2O$, $K_2MoO_4$, $Na_2SnO_3 \cdot 3H_2O$, $K_2SnO_3 \cdot 3H_2O$, $Na_2ZrO_3$ or $K_2ZrO_3$; preferably selected from $NaVO_3$, $KVO_3$, $Na_2MoO_4 \cdot 2H_2O$, $Na_2MoO_4 \cdot 4H_2O$, $K_2MoO_4$, $Na_2SnO_3 \cdot 3H_2O$, $K_2SnO_3 \cdot 3H_2O$, or any mixture thereof preferably is or comprises $Na_2MoO_4 \cdot 4H_2O$.

The tetraalkylammonium hydroxide structure-directing agent is tetraethylammonium hydroxide, tetrabutylammonium hydroxide or tetrapropylammonium hydroxide.

The separation and recovering step g) are performed by filtration, by centrifugation, by dialysis or by using flocculating agents followed by filtration.

The step h) is carried out at a temperature ranging from 400° C. to 800° C. under an air, oxygen or inert atmosphere.

The step c) and/or f) is performed at a temperature ranging from 60° C. to 120° C.

The steps of ageing b) and/or e) are carried out under stirring preferably between 10 h to 25 h, and more preferably from 17 to 20 h.

The step f) of heating the clear suspension of step b) is performed for at most 48 h or is performed for at least 15 h, preferably for 12 to 48 h.

The step c) of heating the clear suspension of step b) is performed for at least 1 hour; preferably at least 2 hours or at least 4 hours or at least 5 hours and/or is performed for at most 96 hours preferably at most 48 hours or at most 24 hours or at most 18 hours.

The synthetic gel obtained after step c) is amorphous, or composed of embryonic zeolite, or partially crystalline, or fully crystalline as measured by powdered XRD.

The synthetic zeolite material comprises at most about 5% by mass of aggregates of nanocrystals, and/or polycrystalline agglomerates, preferably at most 1% by mass of nanocrystals and/or polycrystalline agglomerates, and more preferably, no aggregate of nanocrystals and/or no polycrystalline agglomerates as measured by SEM.

The gel obtained in said step d) has a pH ranging from 9 to 14, preferably from 11 to 14.

The method is fluoride-free and/or boron-free.

According to a second aspect, the disclosure relates to the use of the synthetic zeolite material prepared according to the first aspect as catalyst or adsorbent in gas-solid and liquid-solid reactions, as seed crystals for zeolite synthesis, and for the preparation of membranes or layers or active layers for the detection of hydrocarbons, CO, $CO_2$, NO, $NO_2$.

According to a third aspect, the disclosure relates to a synthetic zeolite material obtained by the method according to the first aspect.

DEFINITIONS

Within the meaning of the present disclosure, the term "clear aqueous suspension", or "water-clear suspension" is understood as it is commonly understood. It means that the suspension appears clear to the eye. In other words, it can be understood as meaning that the aqueous suspension has approximately the same refractive index as water.

Within the meaning of the present disclosure, the term "monodisperse single nanocrystals" is understood to mean that the statistical distribution of the size of the single nanocrystals is relatively narrow.

Within the meaning of the present disclosure, the term "single nanocrystals" is understood to mean individual nanocrystals or non-agglomerated nanocrystals.

Within the meaning of the present disclosure, $TAA_2O$ is the product formed after step a) and directly derived from the tetraalkylammonium hydroxide structure-directing agent (TAAOH) starting material. $TAA_2O$ is a bis(tetraalkylammonium) oxide compound.

In the present disclosure, the zeolite crystals are said "defect-free" or "silanol defect-free". This is understood to mean zeolite crystals comprising a negligible number of silanol-defective sites, arising from the presence of silanols and/or silanol nests. Said material is consequently highly hydrophobic due to the absence of Si—OH moisties. Silanol defects are quantified using (i) IR characterization of activated (calcined) samples, or alternatively (ii) using $^{29}$Si-NMR. The presence or absence of defects is determined by the techniques described above. In particular, the relative number of defects are evaluated following the procedure reported in Nature Materials (2017) 16, 1010-1015, or JACS, ACS 141 (2019) 8689-8693. (10.1021/jacs.9b02589)

TABLE 1

| | Sample | | | |
|---|---|---|---|---|
| Space group | Mo-MFI-1 P21/n (monoclinic) | Mo-MFI-2 P21/n (monoclinic) | SnMFI P21/n (monoclinic) | SiMFI Pnma (orthorhombic) |
| a | 19.8876 (6) | 19.9046 (6) | 19.8858 (0) | 19.8868 (6) |
| b | 20.1177 (4) | 20.1308 (9) | 20.1174 (2) | 20.0577 (5) |
| c | 13.3858 (9) | 13.3900 (9) | 13.3835 (8) | 13.3701 (5) |
| α | 90 | 90 | 90 | 90 |
| β | 90.5491 (3) | 90.5985 (6) | 90.5296 (1) | 90 |
| γ | 90 | 90 | 90 | 90 |
| Volume (Å$^3$) | 5355.37 (9) | 5365.09 (5) | 5353.88 (4) | 5333.13 (0) |
| GOF$^a$ | 1.42 | 1.49 | 1.68 | 1.36 |
| Rp$^b$ | 2.74 | 2.69 | 3.04 | 3.85 |
| wRp$^c$ | 3.57 | 3.64 | 4.16 | 5.08 |

$^a$Goodness of fit
$^b$Expected R-factor
$^c$Weight Profile R-factor

Table 1 showing the Le Bail profile refinement results (unit cell parameters, and refinement values) for MoMFI-1, MoMFI-2, SnMFI, and SiMFI examples. Samples used for Le Bail refinement were recorded from 3 to 80° 2θ for 10 h.

Figure 1:
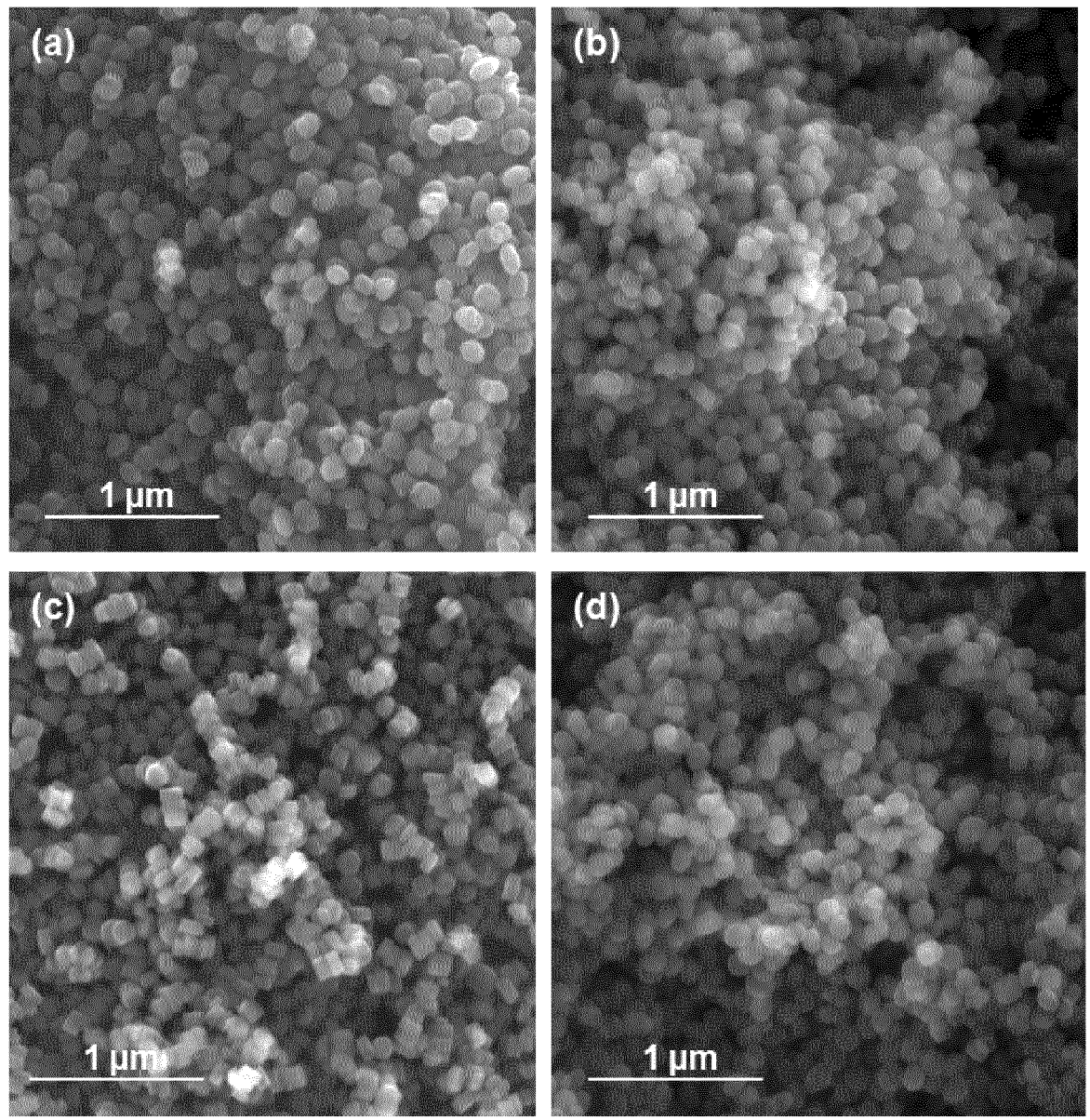
FIG. 1 represents SEM pictures of (a) MoMFI-1, (b) MoMFI-2, (c) SnMFI, and (d) SiMFI samples. The crystal size and morphology correspond to the one from purely siliceous MFI zeolite (silicalite-1) that would be obtained by using the same synthesis procedure without the addition of Molybdenum (FIG. 1d). This obtained crystal size (around 150 nm diameter) is approximately twice smaller than the size that would be obtained by using a normal direct synthesis approach from the same gel composition with molybdenum (around 300 nm).
Figure 2:
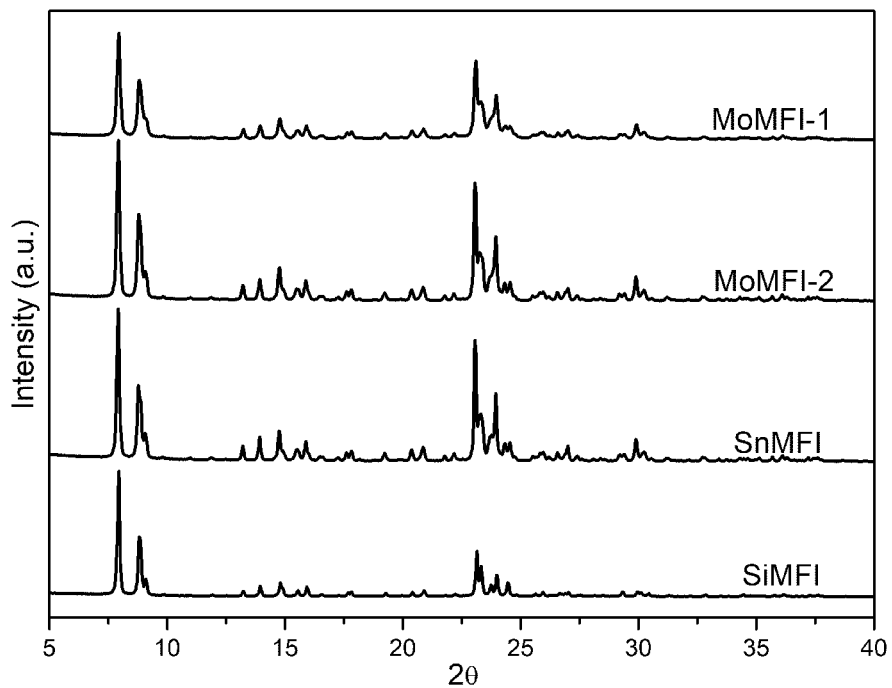
FIG. 2 corresponds to the XRD diffraction patterns of MoMFI-1, MoMFI-2, SnMFI, and SiMFI samples obtained from step h) in the range 3 to 40° 2θ. Only Bragg peaks corresponding to MFI structure are present in all zeolite materials, more specifically, only peaks corresponding to the monoclinic MFI unit cell are observed when it would be expected to have orthorhombic symmetry if only purely siliceous MFI was to be obtained. The monoclinic symmetry can be easily evidenced by the splitting of some diffraction peaks (mainly at 23.30, 23.75, and 24.50° 2θ). Moreover, an expansion of unit cell volume was observed for all samples once compared to purely siliceous silicalite-1 zeolite. Both observations are indicating the presence of heteroatoms (Mo or Sn) in the framework of MFI structure. Details of the Le Bail profile refinement fits are presented in Table 1.
Figure 3:
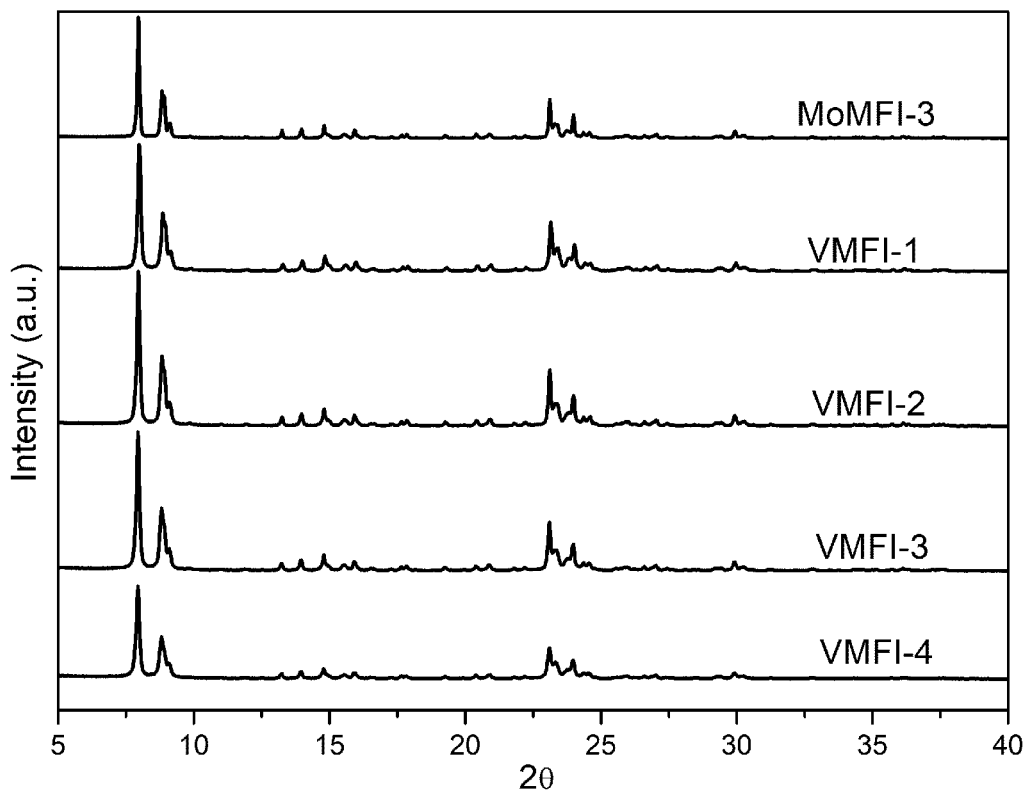

FIG. 3 showing the X-ray diffraction patterns of the samples MoMFI-3, VMFI-1, VMFI-2, VMFI-3, and VMFI-4. All samples exhibit splitting of diffraction peaks (mainly at 23.30, 23.75, and 24.50° 2θ) linked to a monoclinic symmetry, indicative of an effective metal introduction, and healing of silanol defects.

Figure 4:
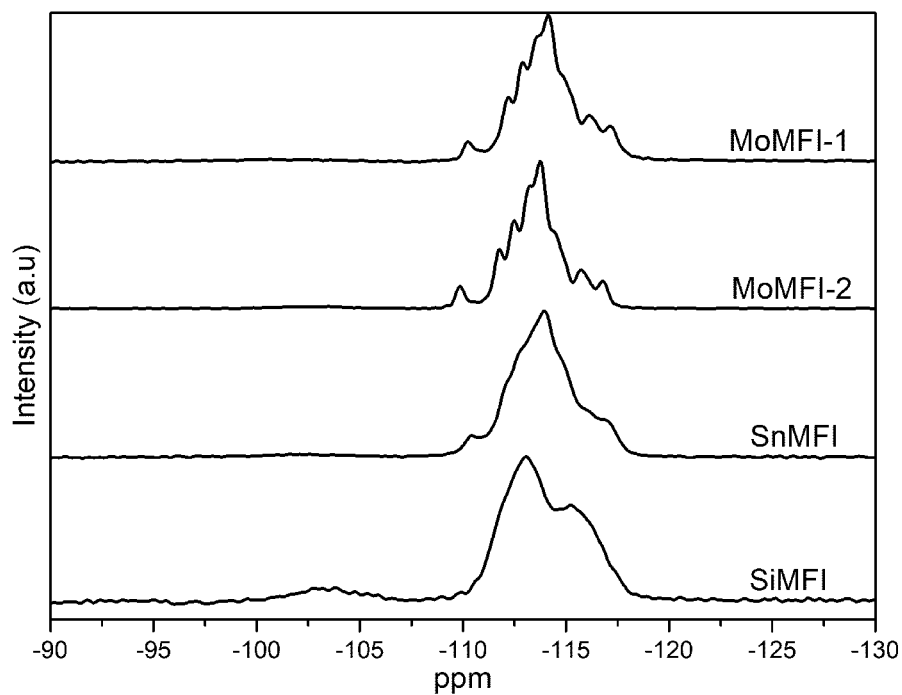

FIG. 4 shows $^{29}$Si MAS NMR spectra of MoMFI-1, MoMFI-2, SnMFI, and SiMFI samples obtained after step h). Absence of Q3 species and high resolution of Q4 species was obtained indicating the very low amount of silanol defects in the metal-containing samples, and the local homogeneity of the samples, with regards to purely siliceous MFI zeolite (sample SiMFI).

Figure 5:
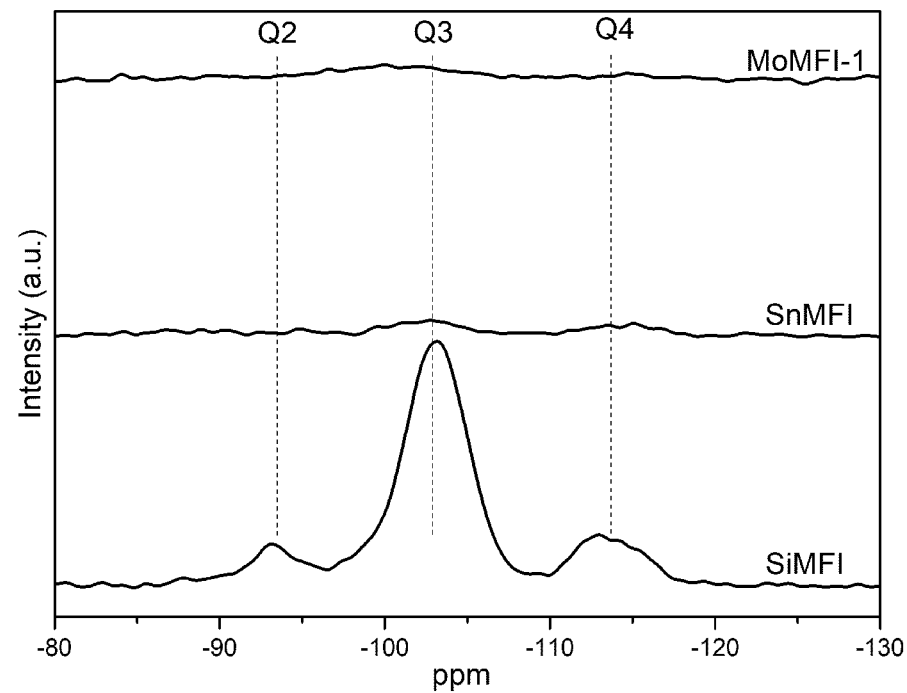

FIG. 5 represents the {$^1$H} $^{29}$Si CP MAS NMR experiment for sample MoMFI-1, SnMFI, and SiMFI, where the absence/negligible amount of silanols is demonstrated through the absence of any signal for both metal-containing samples with regards to sample SiMFI.

Figure 6:
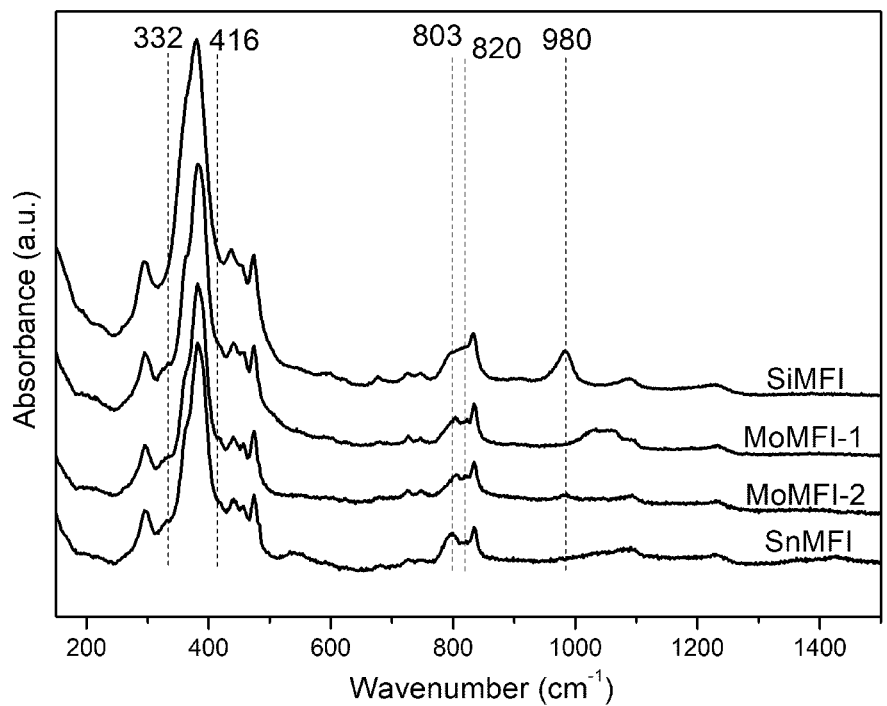

FIG. 6 represents the Raman spectra of samples SiMFI, MoMFI-1, MoMFI-2 and SnMFI. The absence of any metal oxide phase is confirmed for all samples. New contributions at 332, 416, 803, and 820 cm$^{-1}$ indicate the presence of framework metal species. The low amount of silanol defects can also be observed by the absence of a signal at about 980 cm$^{-1}$ for metal-containing zeolites. No peaks corresponding to oxide phase of molybdenum (higher intensity band expected at 980 cm$^{-1}$) or tin (higher intensity band expected at 632 cm$^{-1}$) can be observed, indicating the absence of oxide species in both samples.

Figure 7:
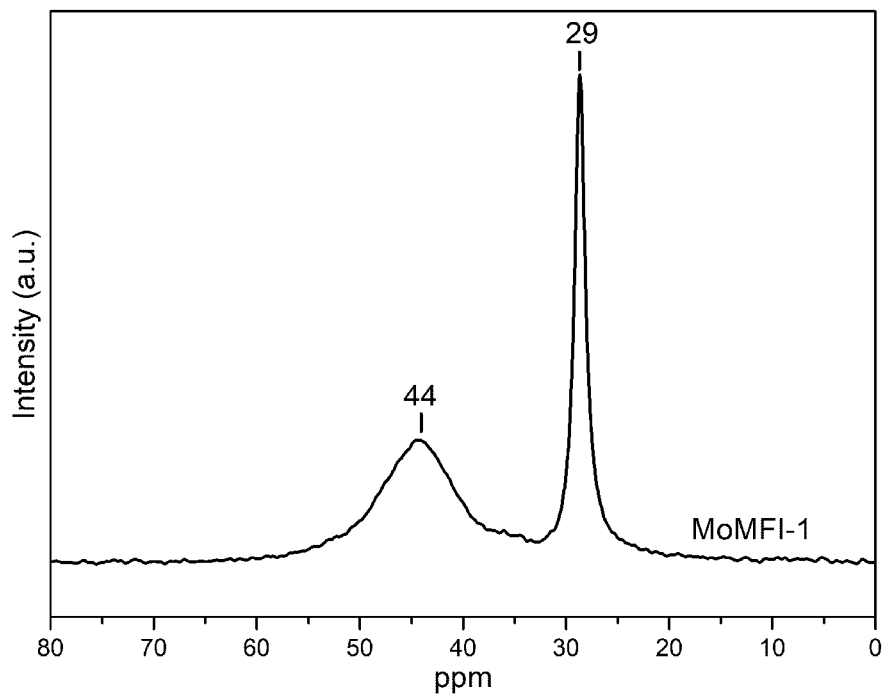

FIG. 7 presents the $^{31}$P MAS NMR spectra of TMPO interacting with MoMFI-1 sample. Two peaks can be observed at 29 and 44 ppm, corresponding to respectively: physisorbed TMPO and TMPO interacting with Lewis acid sites from the MFI zeolite, which are actual Mo framework sites.

Figure 8:
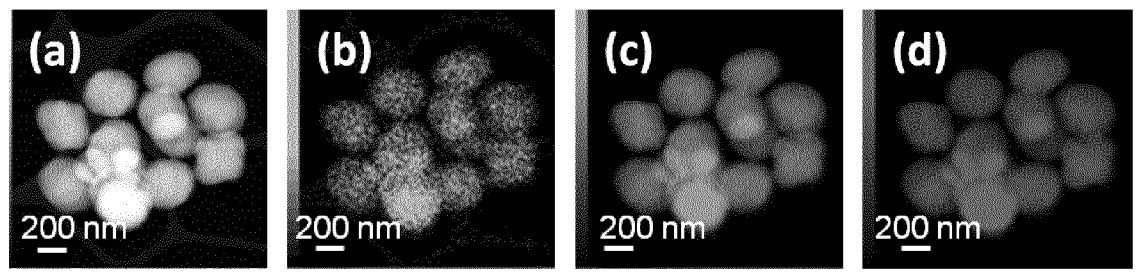

FIG. 8 presents the STEM-EDS micrographs (a) of sample MoMFI-1. The homogeneous distribution (b) of Mo, (c) of Si and (d) of O in the MFI framework are shown.

Figure 9:
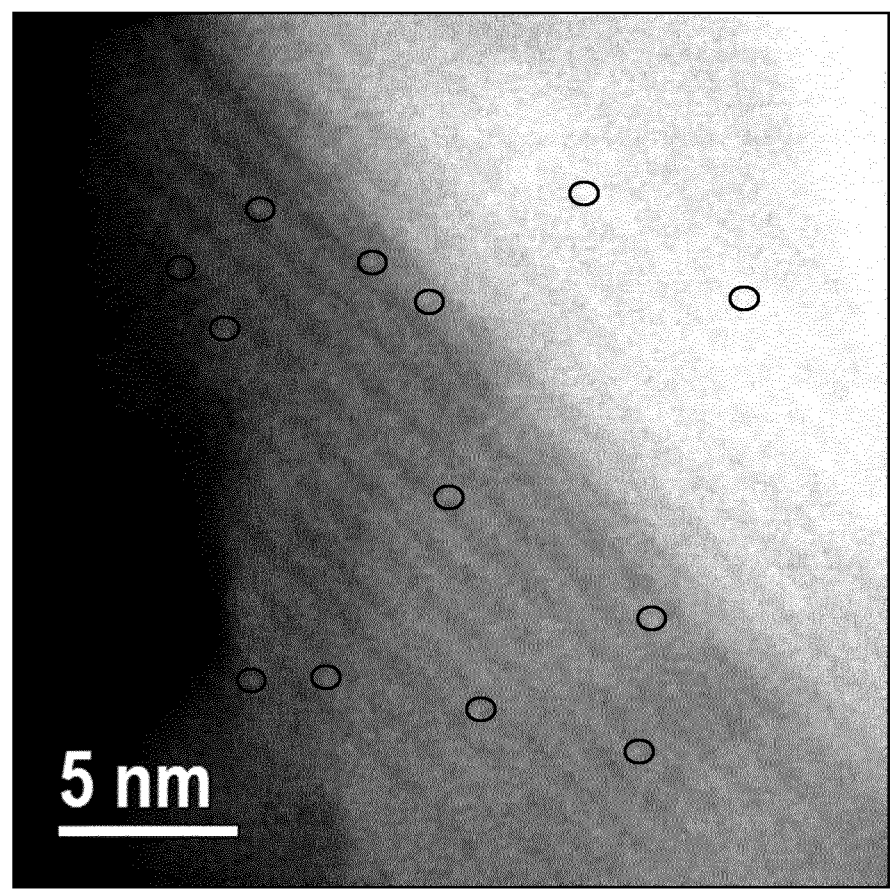

FIG. 9 shows a high-resolution HAADF-STEM image of sample MoMFI-1. The Z-sensitive contrast obtained using this imaging technique allows observing the presence of the Mo metal sites in the structure. Mo appears as white dots, some of them being highlighted with red circles in the figure. Due to the location and size of these sites, it can be concluded that Mo atoms are atomically dispersed in the zeolite MFI framework.

Figure 10:
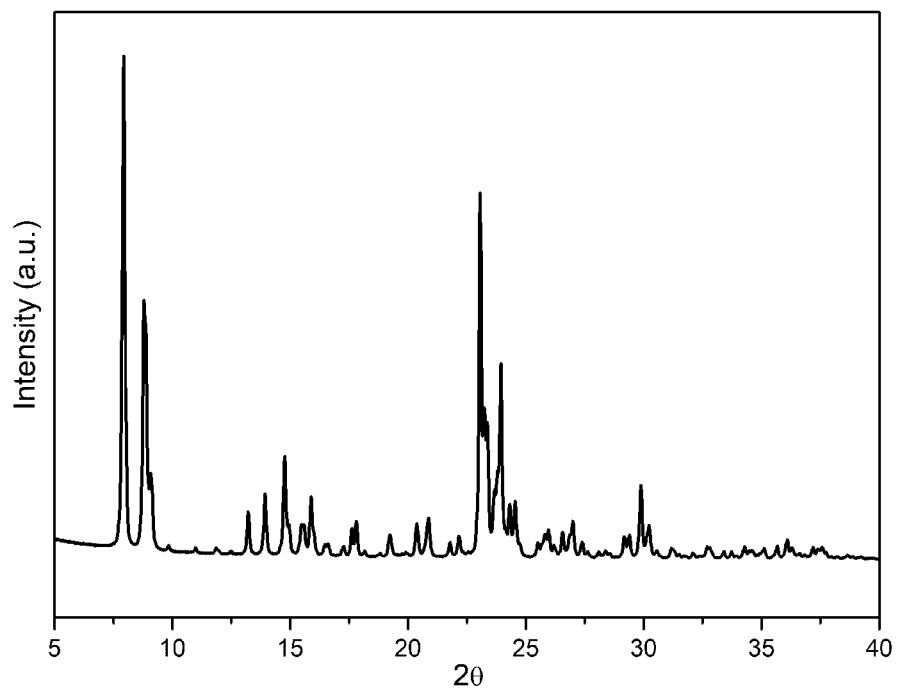
Figure 11:
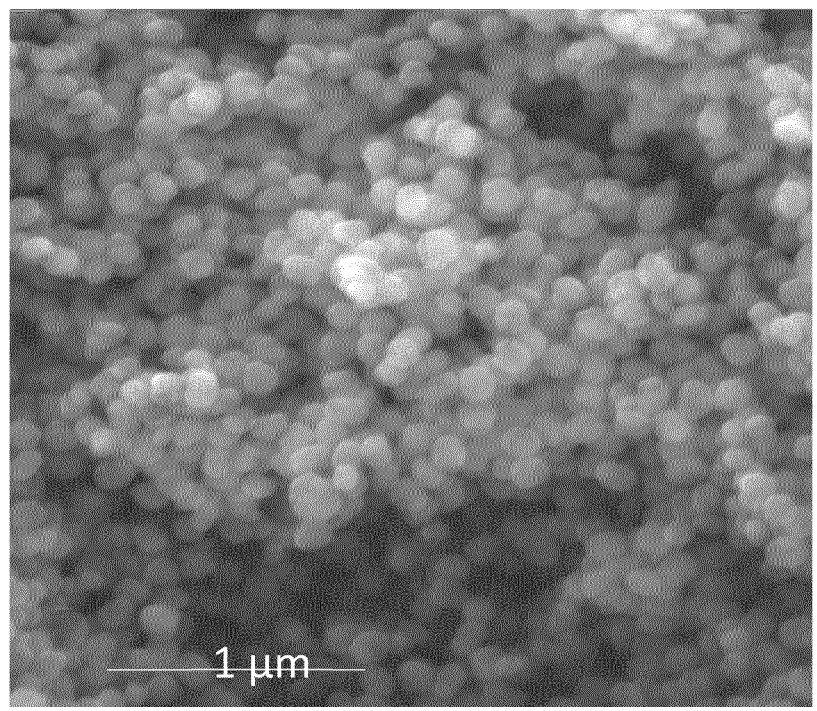
Figure 12:
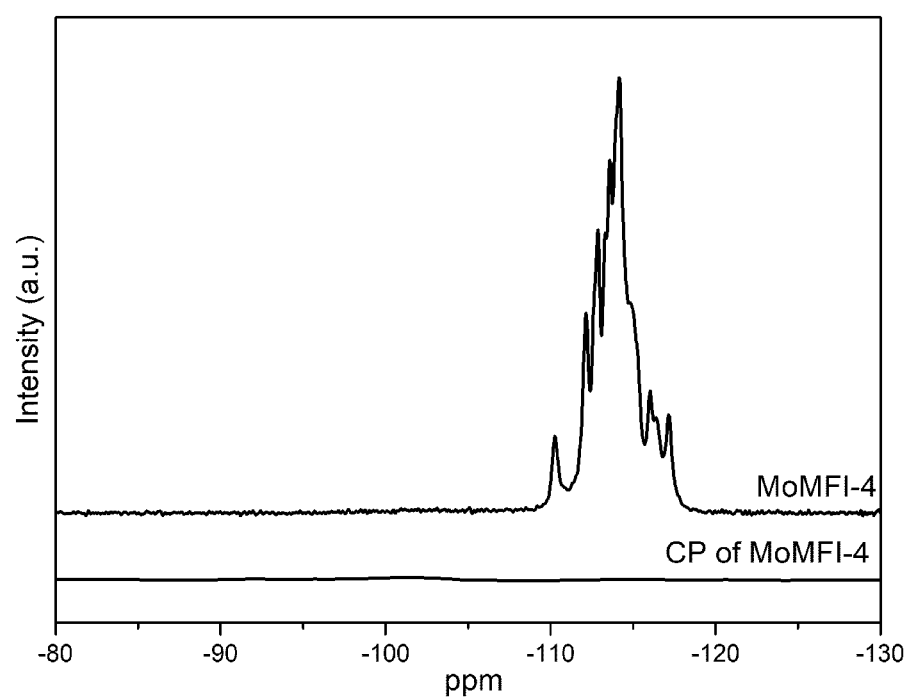

FIG. 10 is an XRD pattern of sample MoMFI-4.
FIG. 11 is an SEM picture of sample MoMFI-4.
FIG. 12 is an $^{29}$Si MAS NMR and $^{29}$Si CP MAS NMR spectra of sample MoMFI-4.

DETAILED DESCRIPTION OF THE DISCLOSURE

The disclosure relates to a method for the preparation of a synthetic zeolite material, containing at least one metal M selected from W, V, Mo, Nb, Sn, Zr, Ag, Co, Ni, Cu, Ti, In and Zn or any mixture thereof with silicon to metal M molar ratio Si/M as determined by inductively coupled plasma optical emission spectrometry ranging from 179 to 65440, wherein said method comprises the following steps:
a) contacting at least one source of silicon, at least one tetraalkylammonium hydroxide structure-directing agent, TAAOH, and water, so as to obtain an aqueous suspension having the following molar composition (I):

1SiO$_2$:y TAA$_2$O:z H$_2$O in which:
0.04<y<0.40, and more preferably 0.2<y<0.3,
8<z<120, and more preferably 20<z<50.
b) ageing during a time ranging between 1 h and 100 h the resulting clear suspension from step a) at a temperature ranging from 10° C. to 50° C., preferably 10 to 35° C.;
c) heating for at least 30 min the clear suspension of step b) at a temperature ranging from 40° C. to 180° C., preferably at a temperature ranging from 60° C. to 120° C.;
d) cooling the solution obtained at step c) to 20° C. and adding at least one source of alkali metal M' selected from Li, Na, K, or Cs and at least one metal M, to obtain a gel having the molar composition (II):

xM$_n$O$_m$:1SiO$_2$:y TAA$_2$O:w M'$_2$O:z H$_2$O

In which: the M'/M ratio varies from 0.1 to 4
0.04<y<0.40,
8<z<120,
0.0004<x<0.15,
0.0004<w<0.30,
n is an integer equal to 1 or 2, and
m is an integer and 1<m<6;
e) Ageing said gel obtained at step d) at a temperature ranging from 10° C. to 35° C. for at least 30 min
f) Heating the solution obtained at step e) at a temperature ranging from 40° C. to 180° C., for at least 12 h and at most 96 h
g) Separating the solid from said liquid obtained at step f)
h) Calcining said solid obtained at step g) under autogenous pressure with a relative humidity of 50 to 80% to obtain said synthetic zeolite material.

According to a preferred embodiment of the disclosure, the synthetic zeolite material has an MFI-, BEA-, or FAU-framework type. For example, the synthetic zeolite material has a BEA or an MFI framework type. For example, the synthetic zeolite material has an MFI framework type.

For example, the synthetic zeolite material has an average crystal size ranging from 10 to 800 nm preferably from 10 to 600 nm or from 100 to 800 nm measured by scanning electron microscopy (SEM). For example, the synthetic zeolite material has dispersed nanocrystals.

For example, w is selected to be $0.01<w<0.2$, preferably $0.05<w<0.2$.

For example, x is selected to be $0.01<x<0.1$;,preferably $0.05<x<0.1$.

For example, y is selected to be $0.1<y<0.3$, preferably $0.2<y<0.3$.

For example, z is selected to be $20<z<80$ or $20<z<50$ or $30<z<50$.

For example, the M'/M ratio varies from 0.5 to 2.5.

With regards to the step a), it consists in the nucleation or at least partial crystallisation of the zeolite material. The precise control of nucleation and crystallization steps can, for instance, be controlled by varying the saturation of the synthetic mixture, by changing water or $TAA_2O$ content, by introducing several different $TAA_2O$ organic molecules, or by changing the temperature at which are conducted the hydrothermal treatments [in steps b) and f)], allowing a precise control of particle size and morphology of the synthetic zeolite material. The method according to the present disclosure is particularly advantaging and versatile in that there is no need to have a complete crystallisation at step a).

Advantageously the water used in step a) is de-ionized or double-distilled (dd H2O). As an example, double distillation can be performed as follows:

Tape-water is boiled, and the vapours are condensed in a clean container. The retrieved vapours are then boiled again, and retrieved in a second clean container. The as-obtained dd $H_2O$ can then be used.

The source of silicon can be selected from any source of silicon able to provide monomeric Si2-Si6 oxihydroxide species, during step a). Thus, the amount of larger polymerized silica species such as $[SiOOH]_n$ are excluded from the precursor suspensions resulting in the formation of zeolite nanoparticles under hydrothermal treatments [R. M. Barrer, "Hydrothermal Chemistry of Zeolites", 1982, Academic Press, London].

The tetraalkyl orthosilicates are preferred, and tetraethyl orthosilicates are the most preferred. The source of silicon can preferable by selected from silica hydrogel, silicilic acid, colloidal silica, fumed silica, tetraalkyl orthosilicates, silica hydroxides, precipitated silica and sodium silicates.

The tetraalylammonium hydroxide structure-directing agent is preferably tetraethylammonium hydroxide (TEAOH), tetrapropylammonium hydroxide (TPAOH), or tetrabutylammonium hydroxide (TBAOH).

Preferably step a) does not involve the presence of any other metal atoms than Si i.e. the alkali metals M', or metals M, including aluminium are not present in step a).

The water-clear suspension obtained from the molar composition (I) has preferably a pH of about 12 to 14.

In the preferred embodiment of the method of preparation, the following sub-steps are performed:

a-1) A solution comprising at $TAA_2O$ and double-distilled or de-ionized water is prepared. The solution is then homogenized using preferably a magnetic stirrer.

a-2) To the said solution of step a-1), is then added drop-wise the silicon source under vigorous stirring, performed preferably using a magnetic stirrer.

In a preferred embodiment, the suspension obtained after step a) is placed in a sealed container, in order to prevent any change of the molar composition that could occur because of evaporation of given compounds, such as water.

With regards to the ageing step b), it is preferably carried out by stirring the suspension prepared in step a) using for example, magnetic stirring (e.g. with a magnetic stirrer), and/or by mechanical stirring, and/or by shaking and/or by orbital stirring (e.g. using an orbital shaker). The ageing step b) is performed for at least 1 h. Ageing step b) can preferably be performed for at least 2 h, and preferably for at least 8 hours.

In a preferred embodiment, the stirring is performed by a magnetic stirrer for the first one hour, after the synthesis mixture has been completed in step a). The suspension if-then transferred to an orbital shaker for an additional 18 h of mixing.

The ageing step b) is preferably performed by maintaining the clear suspension prepared in step a) at a relatively low temperature of about 10 to 35° C., preferably below 30° C. and even more preferably at a temperature of about 15 to 25° C. in order to prevent dehydration of the reaction mixture. The use of a sealed container is particularly preferred.

The ageing step b) is preferably performed at a fixed temperature for a time sufficient to favour the nucleation, allowing each particle to generate a nucleus.

During the ageing step b), the suspension remains homogeneous and leads to the formation of a suspension composed of homogeneous amorphous particles.

With regards to step c), this step a hydrothermal treatment of the suspension obtained at the end of step b) is performed. This step c) leads to the formation of secondary building units and/or embryonic zeolites, and/or semi-crystalline zeolitic particles, and/or fully crystalline purely siliceous zeolitic particles; depending on the time and temperature of said hydrothermal treatment. This step is preferably performed so as to form colloidal suspensions of monodispersed zeolite nanocrystals or amorphous particles containing secondary building units.

Without willing to be bound to any theory, it is believed that in step c), nuclei formed in step b) grow to form secondary building units that rearrange themselves into embryonic zeolites, which stands as X-Ray amorphous species comprising secondary building units, and approaching zeolitic features such as rings and cages. These embryonic zeolites then rearrange themselves to form semi-crystalline products that are compounds formed from crystalline and still amorphous materials. These semi-crystalline units then are forming fully crystalline products, which are uniformly distributed in the solution (also called mother-liquor). If the crystallization temperature is too high, i.e. above 180° C., or if it is too low, i.e. below 40° C., bigger crystals or low crystallinity are achieved respectively.

Step c) can be performed in both static conditions or in rotating autoclaves, but preferably in static conditions.

Step c) can preferably be performed in sealed polypropylene bottle, at autogenous pressure preferably bellow 100° C., or in Teflon-lined autoclaves above 100° C.

Step c) is advantageously performed without any agitation (i.e. without any mechanical stirring, or sonication).

Without willing to be bound to any theory, it is believed that the formation of homogeneous amorphous particles in step b) drastically limits the Ostwald ripening of the nanocrystals formed, therefore insuring a narrow particle size distribution of the material in suspension.

At the end of step c), the synthesis mixture can be composed of still fully amorphous material comprising secondary building units, or embryonic zeolites, and/or crystalline materials which are X-ray crystalline. The method being particularly versatile, a fully crystalline, free of amorphous material crystals can also be achieved. Depending on the case, the synthesis mixture can then be still water-clear, or turbid, milky, or composed of sedimented particles in mother-liquor. A milky suspension described here the aspect of the synthetic mixture, being a white liquid, like milk.

With regards to step d), it consists in providing a solution or a gel at a temperature of 20 to 80° C., more preferably, down to about 20 to 50° C. followed by the addition of the alkali metal M'.

The gel obtained at step c) can be directly used once the concentration of the various species is adapted to reach the composition (II).

The addition of the metal M and alkali metal M' can be either done under vigorous agitation, preferably performed by a magnetic stirrer, the addition of metals M and M' is performed.

The metals M and M' can be introduced for instance together, as fully dissolved species in water, preferably as a concentrated metallic aqueous solution.

All alkali metals can be used but the prefered alkali metals are Li or Na because with those alkali metals the synthesis is easier.

In a particularly advantageous embodiment, the sources of metal M and metal M' are provided by the same component being a source of both M and M'. Such components are therefore alkali metallates such as $Na_2WO_4$, $K_2WO_4$, $NaVO_3$, $CsVO_3$, $LiVO_3$, $KVO_3$, $Na_2MoO_4$, $K_2MoO_4$, $Na_2SnO_3$, $K_2SnO_3$, $Na_2ZrO_3$ or any mixture thereof; preferably selected from $NaVO_3$, $KVO_3$, $Na_2MoO_4.2H_2O$, $Na_2MoO_4.4H_2O$, $K_2MoO_4$, $Na_2SnO_3.3H_2O$, $K_2SnO_{3.3}H_2O$, or any mixture thereof preferably is or comprises $Na_2MoO_4.4H_2O$.

The absence of M' from the synthesis mixture would result in the impossibility to introduce M in the zeolitic structures and would prevent the defect-healing process involving the metal M to occur. The presence of these M' alkali metal species is therefore of first importance for the method of the present disclosure to work out.

The overall synthetic mixture composition, after full addition of the metal M and M' in dissolved in water, is following the molar composition (II).

During the addition of metal species, the gel viscosity may dramatically change, and formation of precipitates may be observed. The synthesis procedure of the prevent can still work out as long as a part of the metals (both M and M') are soluble in the synthetic mixture.

For example, the metal M is selected from W, V, Mo, Sn, Zr, Ag, Co, Ni, Cu, Ti, In, Zn or any mixture thereof; preferably selected from W, V, Mo, Sn, Zr, Co, Ni, Cu, Ti, In, Zn and any mixture thereof; more preferably selected from W, V, Mo, Sn, Zr, Ni, Cu, Ti, and any mixture thereof; even more preferably selected from W, V, Mo, Sn, Zr and any mixture thereof; most preferably Mo, Sn and V or any mixture thereof; and even most preferably is or comprises Mo.

For example, the alkali metal M' is selected from Li, Na, K, Cs and any mixture thereof. for example, the alkali metal M' is selected from Li, Na or K, For example, the alkali metal is Na and/or K.

With regards to step e), it consists of an additional ageing step similar to the ageing step b). This ageing step is preferably shorter than the ageing step b). Preferably the duration of the aging step e) is 1 h, at relatively low temperature ranging from 10 to 35° C. The preferred method of agitation is magnetic stirring.

The goal of this step is to achieve a homogeneous distribution of the metallic species in the synthetic mixture, or at least, a distribution as homogeneous as possible.

With regards to step f), it consists of a hydrothermal treatment performed after step e). The conditions of this second hydrothermal treatment step f) can be the same as the conditions of step c).

The temperature of hydrothermal treatment can be ranging from 40° C. to around 180° C. Most preferably, the same temperature is kept for step c) and step f).

Step f) is preferably performed under autogenous pressure, in static conditions (i.e. without agitation).

The time of hydrothermal treatment is at least 30 min preferably at least 2 h, preferably at least 24 h, in order to allow metallic species to react with silanol defective sites, thus curing silanol defects in the zeolite, isomorphous substituting in the zeolitic material. Depending on the state of the material during step e), it can be required to perform longer crystallization time in order to obtain fully crystalline material.

Depending on the state of the synthesis material in step e), it is possible to obtain a different radial distribution of metals in the final product, based on the defective site locations in the material in step e). Amorphous zeolitic materials have homogeneous distribution of defective site, allowing for homogeneous radial distribution of metal on final products, when crystalline materials tend to have higher amount defective sites in their periphery, allowing for a radial gradient of metal composition in the final product obtained at the end of the procedure of the present disclosure. After step f), zeolite crystals are uniformly dispersed in the mother liquor and the particles are not agglomerated.

Without willing to be bound to any theory, it is believed that the delayed addition of metals M and M' at step d), allows to prevent these metallic compounds from reacting and interfering with the nucleation process described in steps a) and b). As a result, the final particle size and morphology will be mostly dependant on the conditions of step a), b), and c), allowing for better management of particle size and morphology of the final products obtained at the end of the synthesis method of the present disclosure.

With regards to step g), it consists in a separation and recovering step (i.e. purification and/or washing step) that can preferably be performed by filtration, centrifugation, dialysis, or by using flocculating agents followed by filtration, so as to separate and recover the solid (comprising the zeolite synthetic materials) from the mother-liquor.

The separation and recovering step g) may advantageously be repeated at least two times, and preferably 5 times, with intermediate double distilled or de-ionized water addition to the solid particles, in order to purify the solid particles, and remove any remnants from the mother-liquor that are materials that are not converted into zeolite material Separation and recovering step g) is preferably performed using high-speed centrifugation. Washes with water are preferentially performed until the remaining water (from washes) has a pH of about 7 to 8.

After step g), the solid still contains the structure-directing agent which has been imprisoned into the zeolite cavities or channel system.

With regards to step h), it consists of a calcination. Once the solid is separated from the mother-liquor, at the end of step g), it is submitted to calcination step h) (i.e. heat treatment).

Step h) is carried out at temperature ranging from 400° C. to 800° C., for example, during 1 to 10 hours approximately, under a mixture of air, oxygen, an inert gas (such as nitrogen) and preferable in the presence of small amount of water vapours (i.e. with a relative humidity of the gas used of about 1 to 5%).

The calcination step h) aims to remove all the structure-directing agent still present in the zeolitic material obtained from step g).

Without willing to be bound to any theory, it is believed that the thermal treatment does not degrade the structure of the zeolite material due to its high thermal stability achieved thanks to the defective sites healing performed by the metals M and M'.

It is also believed that to reduce the silanol species content of the zeolite material, some water vapours in the gas mixture used during the calcination step is particularly preferred.

Before calcination treatment of step h), it is preferred to dry the sample. This drying step can be performed at 50 to 100° C., preferably at 80 to 90° C. The drying step is generally performed for 10 hours. A shorter duration of the drying step allowing to remove all the remaining water and allowing to obtain a powdered sample out of step g) may also be used. In a preferred embodiment, freeze-drying can also be performed in order to reduce drastically the chances of agglomerated particles. This is particularly preferred in case the drying step using a conventional oven yields to the formation of some agglomerates. Freeze-drying, or lyophilisation, is preferably performed at around −76 to −92° C., at sub-atmospheric pressure, for about 48 h.

With regards the synthetic zeolite material, it is defined with silicon to metal M molar ratio Si/M as determined by inductively coupled plasma optical emission spectrometry ranging from 117 to 65440 as determined by inductively coupled plasma optical emission spectrometry.

For example, the synthetic zeolite material has a silicon to metal M molar ratio Si/M is ranging from 179 to 65440 as determined by inductively coupled plasma optical emission spectrometry; preferably ranging from 438 to 1752.

For example, the synthetic zeolite material has a silicon to metal M molar ratio Si/M of at least 179, preferably of at least 200 or at least 240 or at least 250.

For example, the synthetic zeolite material has a silicon to metal M molar ratio Si/M of at most 1800 or at most 1752 or at most 1500.

For example, the synthetic zeolite material comprises a metal M with a content ranging from 0.1 to 1.5 wt. % with respect to the total mass of the material measured according via EDS-TEM; preferably ranging from 0.2 to 1.3 wt. %; more preferably ranging from 0.3 to 1.2 wt. %; and even more preferably ranging from 0.4 to 1.0 wt. % or ranging from 0.5 to 0.8 wt. %. For example, the synthetic zeolite material has an average crystal size ranging from 10 to 800 nm or from 100 to 800 nm measured by scanning electron microscopy (SEM), preferably from 10 to 600 nm or from 40 to 700 nm.

For example, the synthetic zeolite material has dispersed nanocrystals.

For example, the cross-polarization spectra {1H} 29Si CP MAS NMR of the synthetic zeolite material recovered on step h) presents no peak. This indicates the absence of silanol species (i.e. defects) in the zeolite.

With regards to optional further steps, the method can further comprise after step h), an ion-exchange procedure in which alkali metal M' is removed from the zeolite, but metal M is kept. Such procedure can be used in case the material is intended to be used as a catalyst in acidic catalysis. In this optional embodiment, the procedure is at it follows:

After the solid powder obtained at step h) is added to an aqueous solution containing a salt of ammonium cation so that the alkali metal M' is replaced with ammonium. The ammonium salt used is preferably ammonium chloride ($NH_4Cl$), with a concentration of about 1.1 wt. % (0.02M). For instance, 10 mL of solution containing the ammonium is added for 100 mg of zeolite solid product from step h). The procedure is preferably repeated twice with an intermediate separation procedure, best performed using centrifugation. The solid sample can then be retrieved and washed with water. The washing step is also performed preferably by using centrifugation. The ammonium salt used is preferably ammonium chloride (NH4Cl), with a concentration of about 1.1 wt. % (0.02M). For instance 10 mL of solution containing the ammonium is added for 100 mg of zeolite solid product from step h). The procedure is preferably repeated twice with an intermediate separation procedure, best performed using centrifugation. The solid sample can then be retrieved and washed with water. The washing step is also performed preferably by using centrifugation.

The as-obtained material can then be dried and calcined according to the procedure described in step h).

It is believed that this procedure may generate some isolated silanol species, but the amount of silanol generated by such procedure is still very low and far below any materials that would have been synthesized using a different approach than the approach described in the present disclosure.

EXAMPLES

Nine examples of metal-containing MFI zeolite materials are described in the following section (one comparative example and examples 1 to 5):

The starting materials used in the examples are as follow:
Tetraehtylorthosilicate (TEOS), 98%, from Aldrich
Tetrapropylammonium hydroxyl (TPAOH), 20 wt. % in water (1 M), from Alfa Aesar
Sodium molybdate tetrahydrated ($Na_2MoO_4$, $4H_2O$), 98%, from Alfa Aesar
Ammonium hepta-molybdate (($NH_4)_6Mo_7O_{24}$), from Alfa Aesar
Sodium chloride (NaCl) from Alfa Aesar
Lithium, sodium, potassium, or caesium vanadate (Li, Na, K, CsVO3) from Aldrich
Sodium stannate ($Na_2SnO_3$), 95%, from Aldrich
Double distilled water These materials were used as received from manufacturers without any further purification.

The zeolite samples described in the following examples are characterized by various methods as listed below:

Scanning Electron Microscopy (SEM):

Scanning electron microscopy images of examples after step h) were recorded using a MIRA\LMH (TESCAN) microscope, with an electron beam of 30 kV.

Powder X-Ray Diffraction (XRD):

Powder samples of zeolites obtained after step h) were measured using a PANalytical X'Pert Pro X-ray diffractometer equipped with a monochromator specific to CuKα radiation ($\lambda=1.5418$ Å, 45 kV, 40 mA). Samples were measured from 3 to 70° 2θ, with a step size of 0.016°. Le Bail profile refinement of each XRD patterns was also performed.

Solid-State Nuclear Magnetic Resonance of Silicon ($^{29}$Si MAS NMR):

Powder samples obtained after step h) are packed into zirconia rotor of 4 mm outer diameter spun at 12 kHz, in a Bruker Avance III-HD 500 (11.7 T) spectrometer operating at 99.3 MHz. 29Si MAS NMR spectra are recorded from a single pulse excitation (30° flip angle), used with a recycle delay of 30 s. {1H} 29Si cross-polarization (CP) solid-state MAS NMR was acquired using a contact time of 5 ms and a recycle delay of 2 s. Chemical shifts were referenced to tetramethyl silane (TMS).

Solid-State Nuclear Magnetic Resonance of Phosphorus ($^{31}$P MAS NMR):

Powdered sample obtained after step h) and subsequently ion exchanged in order to have the H-form, are analysed in 31P MAS NMR under 1H decoupling, using a phosphorus probe molecule: trimethylphosphine oxide (TMPO). All the following preparation steps are performed under Argon atmosphere to prevent interaction of water with the probe molecule. The sample is first dehydrated, by heating at 400° C. for 4 h under vacuum (ay. 4.0×10-5 Torr). In the meanwhile, a solution of TMPO dissolved in dichloromethane is prepared in anhydrous conditions. The solution is then added to the dehydrated sample. The as-obtained suspension is then subjected to sonication for 15 minutes, before the dichloromethane solvent is removed under vacuum, leaving the TMPO probe molecule impregnated into the zeolite sample. TMPO loaded sample is then packed into 4 mm outer-diameter zirconium rotor and analyzed using 31P MAS NMR, performed on an 11.7 T Bruker Avance 500 spectrometer operating at a frequency of 500.0 MHz and 202.4 MHz for 1H and 31P respectively. A spinning rate of 14 kHz was used. 31P π/2 and π-pulses lengths were 7 and 14 μs respectively for all measurements.

Raman Spectroscopy:

Samples obtained after step h) were measured using Raman spectrometry. The Raman spectra were collected on a Jobin Yvon Labram 300 confocal Raman spectrometer coupled to an optical microscope (objective 50×) and a CCD detector. A 532 nm wavelength laser was used, and spectra were accumulated 3 times for 60 s each. The power applied to the sample did not exceed 20 mW upon measurement.

Scanning transmission electron microscopy with energy dispersive X-Ray analysis (STEM/EDS or EDS-TEM.) and High Angle Annular Dark Field imaging (HAADF-STEM): Experiments were performed on an Analytical double (objective and probe) corrected JEOL ARM200CF equipped with a 100 mm Centurio EDS detector, and a Quantum GIF for the EELS. A probe of 0.1 nm was used to scan the sample in STEM mode and Bright Field and High Angle Annular Dark Field detectors were simultaneously employed for imaging. Camera length was 8 cm, and two different accelerating voltages of 200 and 80 kV were used in the STEM mode for imaging and chemical analysis respectively. Owing to the enhanced Z-contrast developed at 200 kV, this configuration was used for imaging and a high-speed scanning protocol (10 μsec/px) was employed in order to prevent sample degradation under the electron beam. To avoid such degradation, STEM-EDS analytical assays were carried out at 80 kV, with a scanning speed of 3 μs/px for a mean duration of 60 minutes. A cross-correlation algorithm implemented in the Jeol Analysis Station software was applied every 30 seconds in an effort to compensate for the special drift occurring during the test. The microstructure of samples was checked prior and after each EDS scan.

The method provides results in atomic % that are converted in wt. % using Tecnai Microscope control software.

Inductively coupled plasma (ICP) optical emission spectrometry was used to determine the chemical compositions using a Varian ICP-OES 720-ES. The Si/Al molar ratio or the Si/M molar ratio are determined using the said method.

Comparative Example

SiMFI Zeolite

Preparation of Purely Siliceous Si-MFI Zeolite from the Same Gel Composition and Crystallization Method as Samples of the Present Disclosure. Note: This Sample is Not Part of the Disclosure Step a):

In a polypropylene synthesis bottle (125 mL), solution A is prepared by adding 24.591 g of TPAOH (1M) and 42.581 g of double-distilled water, under agitation performed using a magnetic stirrer. To this solution A is then added drop-wise 18 g of TEOS, under stirring performed by a magnetic stirrer. The solution should be water clear and liquid. Upon preparation, the gel might be slightly inhomogeneous, but the solution should end up being water-like during the ageing step (beginning of step b)). The final overall molar gel composition (solution A and B mixed) is 1 $SiO_2$: 0.28 TPAOH: 40 H2O.

Step b):

The bottle containing the solution prepared in step a) is air-tightly closed with a cap. The as-made synthetic suspensions are left for ageing under magnetic stirring for 1 h, and then on an orbital shaker for an additional 18 h. All the steps up to this point are performed at a temperature between 10 and 35° C. and an ambient pressure between 0.9 and 1.2 Bar.

Step c):

The synthesis mixture is water-like at this point. The synthetic mixture, still in its air-tightly closed bottle, is then subjected to static hydrothermal treatment at 90° C., for a duration of 48 h.

Step d):

The sample is removed from the oven after step c), and cooled down to room temperature. The solid phase is then separated from the liquid phase using centrifugation. The solid is dispersed in distilled water and centrifugation is performed again. This washing procedure is repeated until the pH of the liquid separated from the solid phase is around 7-8.

Step e):

The obtained solid sample is then dried in a static oven at 80° C. overnight.

The dried sample retrieved is then subjected to the following calcination procedure: In ambient atmospheric conditions (composition of the atmosphere, and atmospheric pressure), the sample is placed in a muffle furnace. The furnace heats up from room temperature to 550° C. in 5 h, holds at 550° C. for an additional 5 h, before the furnace is allowed to cool down to room temperature in 5 h. The as-obtained sample from step e) is called SiMFI.

Example 1

MoMFI-1

Preparation of Molybdenum (Mo) Containing MFI Zeolite by Staged Synthesis Approach (Metal Source was Added to the Amorphous Material with a Delay of 5 h)

Step a):

In a polypropylene synthesis bottle (125 mL), solution A is prepared by adding 8.197 g of TPAOH (1M) and 11.194 g of double-distilled water, under agitation performed using a magnetic stirrer. To this solution A is then added drop-wise 6 g of TEOS, under stirring performed by a magnetic stirrer. The solution should be water clear and liquid. Upon preparation, the gel might be slightly inhomogeneous, but the solution should end up being water-like during the ageing step (beginning of step b)).

Step b):

The bottle containing the solution prepared in step a) is air-tightly closed with a cap. The as-made synthetic suspensions are left for ageing under magnetic stirring for 1 h, and then on an orbital shaker for an additional 18 h. All the steps up to this point are performed at a temperature between 10 and 35° C. and an ambient pressure between 0.9 and 1.2 Bar.

Step c):

The synthesis mixture is water-like at this point. The synthetic mixture, still in its air-tightly closed bottle, is then subjected to static hydrothermal treatment at 90° C., for a duration of 5 h.

Step d):

The synthesis bottle is retrieved from step c), and cooled down to room temperature under magnetic agitation, without opening the bottle. The synthesis mixture inside is still fully amorphous at this stage of the synthesis method. A solution B is prepared from 0.553 g of sodium molybdate di-hydrated $Na_2MoO_4.2H_2O$ dissolved in 3 mL of double-distilled water. The solution is hand-shaken until it becomes water-clear. Solution B is then added drop-wise to the mixture that has just been cooled down, under vigorous magnetic stirring.

Step e):

After full addition of the metal source, the bottle is closed again and left under magnetic stirring for an additional 1 h. The final overall molar gel composition (solution A and B mixed) is 1 $SiO_2$:0.28 TPAOH: 0.08 $MoO_3$:0.08 $M'_2O$:40 $H2O$.

Step f):

The obtained synthesis mixture from step e) is then placed in a static oven at 90° C. for 43 h.

Step g):

The sample is removed from the oven after step e), and cooled down to room temperature. The solid phase is then separated from the liquid phase using centrifugation. The solid is dispersed in distilled water and centrifugation is performed again. This washing procedure is repeated until the pH of the liquid separated from the solid phase is around 7-8.

Step h):

The obtained solid sample is then dried in a static oven at 80° C. overnight.

The dried sample retrieved is then subjected to the following calcination procedure: In ambient atmospheric conditions (composition of the atmosphere, and atmospheric pressure), the sample is placed in a muffle furnace. The furnace heats up from room temperature to 550° C. in 5 h, holds at 550° C. for an additional 5 h, before the furnace is allowed to cool down to room temperature in 5 h. The as-obtained sample from step h) is called MoMFI-1.

The sample contains 0.53 wt. % of Mo and a Si/Mo molar ratio of 250.

Example 2

MoMFI-2

Preparation of Molybdenum (Mo) Containing MFI Zeolite by Staged Synthesis Approach (Metal Source was Added to the Fully Crystalline Material with a Delay of 48 h)

Step a):

In a polypropylene synthesis bottle (125 mL), solution A is prepared by adding 8.197 g of TPAOH (1M) and 11.194 g of double-distilled water, under agitation performed using a magnetic stirrer. To this solution A is then added drop-wise 6 g of TEOS, under stirring performed by a magnetic stirrer. The solution should be water clear and liquid. Upon preparation, the gel might be slightly inhomogeneous, but the solution should end up being water-like during the ageing step (beginning of step b)).

Step b):

The bottle containing the solution prepared in step a) is air-tightly closed with a cap. The as-made synthetic gel is left for ageing under magnetic stirring for 1 h, and then on an orbital shaker for an additional 18 h. All the steps up to this point are performed at a temperature between 10 and 35° C. and an ambient pressure between 0.9 and 1.2 Bar.

Step c):

The synthesis mixture is water-like at this point. The synthetic gel, still in its air-tightly closed bottle, is then subjected to static hydrothermal treatment at 90° C., for a duration of 48 h.

Step d):

The synthesis bottle is retrieved from step c), and cooled down to room temperature under magnetic agitation, without opening the bottle. The mixture inside is composed of purely siliceous fully crystalline MFI zeolite in its mother-liquor. A solution B is prepared from 0.553 g of sodium molybdate $Na_2MoO_4.2H_2O$ dissolved in 3 mL of double-distilled water. The solution is hand-shaken until it becomes water-clear. Solution B is then added drop-wise to the mixture that has just been cooled down, under vigorous magnetic stirring.

Step e):

After full addition of the metal, the synthesis bottle is closed again and left under magnetic stirring for an additional 1 h. The final overall molar gel composition (solution A and B mixed) is 1 $SiO_2$: 0.28 TPAOH: 0.08 $MoO_3$: 0.08 $M'_2O$: 40 $H_2O$.

Step f):

The obtained synthesis mixture from step e) is then placed in a static oven at 90° C. for 24 h.

Step g):

The sample is removed from the oven after step e), and cooled down to room temperature. The solid phase is then separated from the liquid phase using centrifugation. The solid is dispersed in distilled water and centrifugation is performed again. This washing procedure is repeated until the pH of the liquid separated from the solid phase is around 7-8.

Step h):

The obtained solid sample is then dried in a static oven at 80° C. overnight.

The dried sample retrieved is then subjected to the following calcination procedure: In ambient atmospheric conditions (composition of the atmosphere, and atmospheric pressure), the sample is placed in a muffle furnace. The furnace heats up from room temperature to 550° C. in 5 h, holds the temperature at 550° C. for an additional 5 h before the furnace is allowed to cool down to room temperature in 5 h. The as-obtained sample from step h) is called MoMFI-2.

Example 3

SnMFI

Preparation of Tin (Sn) Containing MFI Zeolite by Staged Synthesis Approach (Metal Source was Added to the Amorphous Material with a Delay of 5 h)

Step a):

In a polypropylene synthesis bottle (125 mL), solution A is prepared by adding 8.197 g of TPAOH (1M) and 11.194 g of double-distilled water, under agitation performed using a magnetic stirrer. To this solution A is then added drop-wise 6 g of TEOS, under stirring performed by a magnetic stirrer. The solution should be water clear and liquid. Upon preparation, the gel might be slightly inhomogeneous, but the solution should end up being water-like during the ageing step (beginning of step b)).

Step b):

The bottle containing the solution prepared in step a) is air-tightly closed with a cap. The as-made synthetic gel is left for ageing under magnetic stirring for 1 h, and then on an orbital shaker for an additional 18 h. All the steps up to this point are performed at room temperature and ambient pressure.

Step c):

The synthesis mixture is water-like at this point. The synthetic gel, still in its air-tightly closed bottle, is then subjected to static hydrothermal treatment at 90° C., for a duration of 5 h.

Step d):

The synthesis bottle is retrieved from step c), and cooled down to room temperature under magnetic agitation, without opening the bottle. The synthesis mixture inside is still fully amorphous at this stage of the synthesis method. A solution B is prepared from 0.461 g of sodium stannate tri-hydrated $Na_2SnO_3.3H_2O$ dissolved in 3 mL of double-distilled water. The solution is hand-shaken until it becomes water-clear. Solution B is then added dropwise to the mixture that has just been cooled down, under vigorous magnetic stirring.

Step e):

After full addition of the metal, the synthesis bottle is closed again and left under magnetic stirring for an additional 1 h. The final overall molar gel composition (solution A and B mixed) is 1 $SiO_2$: 0.28 TPAOH: 0.06 $SnO_3$: 0.06 $M'_2O$: 40 $H_2O$.

Step f):

The obtained synthesis mixture from step e) is then placed in a static oven at 90° C. for 43 h.

Step g):

The sample is removed from the oven after step e), and cooled down to room temperature.

The solid phase is then separated from the liquid phase using centrifugation. The solid is dispersed in distilled water and centrifugation is performed again. This washing procedure is repeated until the pH of the liquid separated from the solid phase is around 7-8.

Step h):

The obtained solid sample is then dried in a static oven at 80° C. overnight.

The dried sample retrieved is then subjected to the following calcination procedure: In ambient atmospheric conditions (composition of the atmosphere, and atmospheric pressure), the sample is placed in a muffle furnace. The furnace heats up from room temperature to 550° C. in 5 h, holds the temperature at 550° C. for an additional 5 h before the furnace is allowed to cool down to room temperature in 5 h. The as-obtained sample from step h) is called SnMFI.

Example 4

MoMFI-4

Preparation of molybdenum (Mo) containing MFI zeolite by staged synthesis approach (metal sources (M and M') were added to the amorphous material with a delay of 5 h)

Step a): In a polypropylene synthesis bottle (125 mL), solution A is prepared by adding 8.197 g of TPAOH (1M) and 11.191 g of double-distilled water, under agitation performed using a magnetic stirrer. To this solution A is then added drop-wise 6 g of TEOS, under stirring performed by a magnetic stirrer. The solution should be water clear and liquid. Upon preparation, the gel might be slightly inhomogeneous, but the solution should end up being water-like during the ageing step (beginning of step b)).

Step b):

The bottle containing the solution prepared in step a) is air-tightly closed with a cap. The as-made synthetic gel is left for ageing under magnetic stirring for 1 h, and then on an orbital shaker for an additional 18 h. All the steps up to this point are performed at room temperature and ambient pressure.

Step c):

The synthesis mixture is water-like at this point. The synthetic gel, still in its air-tightly closed bottle, is then subjected to static hydrothermal treatment at 90° C., for a duration of 5 h.

Step d):

The synthesis bottle is retrieved from step c), and cooled down to room temperature under magnetic agitation, without opening the bottle. The synthesis mixture inside is still fully amorphous at this stage of the synthesis method. A solution B is prepared from 0.305 g of ammonium heptamolybdate tetra-hydrated $(NH_4)_6Mo_7O_{24}.4H_2O$, and 0.202 g of sodium chloride dissolved in 3 mL of double-distilled water. The solution is hand-mixed until it becomes water-clear. Solution B is then added drop-wise to the mixture that has just been cooled down, under vigorous magnetic stirring.

Step e):

After full addition of the metal, the synthesis bottle is closed again and left under magnetic stirring for an additional 1 h. The final overall molar gel composition (solution A and B mixed) is 1 $SiO_2$: 0.28 TPAOH: 0.06 $MoO_3$: 40 $H_2O$: 0.12 NaCl.

Step f):

The obtained synthesis mixture from step e) is then placed in a static oven at 90° C. for 43 h.

Step g):

The sample is removed from the oven after step e), and cooled down to room temperature. The solid phase is then separated from the liquid phase using centrifugation. The solid is dispersed in distilled water and centrifugation is performed again. This washing procedure is repeated until the pH of the liquid separated from the solid phase is around 7-8.

Step h):

The obtained solid sample is then dried in a static oven at 80° C. overnight.

The dried sample retrieved is then subjected to the following calcination procedure: In ambient atmospheric conditions (composition of the atmosphere, and atmospheric pressure), the sample is placed in a muffle furnace. The furnace heats up from room temperature to 550° C. in 5 h, holds the temperature at 550° C. for an additional 5 h before the furnace is allowed to cool down to room temperature in 5 h. The as-obtained sample from step h) is called MoMFI-3.

Example 5

VMFI-1 to VMFI-5

Synthesis of Vanadium (V) Containing MFI Zeolite by Staged Synthesis Approach, Using Different Alkali Metals (Metal Source was Added to the Amorphous Material with a Delay of 5 h).

VMFI-1

Step a):

In a polypropylene synthesis bottle (125 mL), solution A is prepared by adding 8.197 g of TPAOH (1M) and 11.194 g of double-distilled water, under agitation performed using a magnetic stirrer. To this solution A is then added drop-wise 6 g of TEOS, under stirring performed by a magnetic stirrer. The solution should be water clear and liquid. Upon preparation, the gel might be slightly inhomogeneous, but the solution should end up being water-like during the ageing step (beginning of step b)).

Step b):

The bottle containing the solution prepared in step a) is air-tightly closed with a cap. The as-made synthetic gel is left for ageing under magnetic stirring for 1 h, and then on an orbital shaker for an additional 18 h. All the steps up to this point are performed at room temperature and ambient pressure.

Step c):

The synthesis mixture is water-like at this point. The synthetic gel, still in its air-tightly closed bottle, is then subjected to static hydrothermal treatment at 90° C., for a duration of 5 h.

Step d):

The synthesis bottle is retrieved from step c), and cooled down to room temperature under magnetic agitation, without opening the bottle. The synthesis mixture inside is still fully amorphous at this stage of the synthesis method. A solution B is prepared from 0.183 g of lithium vanadate, dissolved in 3 mL of double-distilled water. The solution is hand-shaken until it becomes water-clear. Solution B is then added drop-wise to the mixture that has just been cooled down, under vigorous magnetic stirring.

Step e): After full addition of the metal, the synthesis bottle is closed again and left under magnetic stirring for an additional 1 h. The final overall molar gel composition (solution A and B mixed) is 1 $SiO_2$: 0.28 TPAOH: 0.03 $V_2O_5$: 0.03 $M'_2O$: 40 $H_2O$.

Step f):

The obtained synthesis mixture from step e) is then placed in a static oven at 90° C. for 43 h.

Step g):

The sample is removed from the oven after step e), and cooled down to room temperature. The solid phase is then separated from the liquid phase using centrifugation. The solid is dispersed in distilled water and centrifugation is performed again. This washing procedure is repeated until the pH of the liquid separated from the solid phase is around 7-8.

Step h):

The obtained solid sample is then dried in a static oven at 80° C. overnight.

The dried sample retrieved is then subjected to the following calcination procedure: In ambient atmospheric conditions (composition of the atmosphere, and atmospheric pressure), the sample is placed in a muffle furnace. The furnace heats up from room temperature to 550° C. in 5 h, holds the temperature at 550° C. for an additional 5 h before the furnace is allowed to cool down to room temperature in 5 h. The as-obtained sample from step g) is called VMFI-1.

The analysis of the sample showed that V is present in VMFI-1 at a content of 0.20 wt. % with respect to the total mass of the material measured according to EDS-TEM. The ratio Si/V as determined by inductively coupled plasma optical emission spectrometry is 416.

VMFI-2

The sample VMFI-2 was produced using the same procedure than for the sample VMFI-1 except that in step d) 0.211 g of sodium vanadate was used.

The analysis of the sample showed that V is present in VMFI-2 at a content of 0.19 wt. % with respect to the total mass of the material measured according to EDS-TEM. The ratio Si/V as determined by inductively coupled plasma optical emission spectrometry is 435.

VMFI-3

The sample VMFI-3 was produced using the same procedure than for the sample VMFI-1 except that in step d) 0.239 g of potassium vanadate was used.

The analysis of the sample showed that V is present in VMFI-3 at a content of 0.81 wt. % with respect to the total mass of the material measured according to EDS-TEM. The ratio Si/V as determined by inductively coupled plasma optical emission spectrometry is 103.

VMFI-4

The sample VMFI-4 was produced using the same procedure than for the sample VMFI-1 except that in step d) 0.401 g of caesium vanadate ($CsVO_3$) was used. The analysis of the sample showed that V is present in VMFI-4 at a content of 0.28 wt. % with respect to the total mass of the material measured according to EDS-TEM. The ratio Si/V as determined by inductively coupled plasma optical emission spectrometry is 300.

The invention claimed is:

1. A method for the preparation of a synthetic zeolite material, containing at least one metal M selected from W, V, Mo, Nb, Sn, Zr, Ag, Co, Ni, Cu, Ti, In and Zn or any mixture thereof, wherein the silicon to metal M molar ration Si/M ranging from 117 to 65440 as determined by inductively coupled plasma optical emission spectrometry, wherein said method comprises the following steps:

a) contacting at least one source of silicon, at least one tetraalkylammonium hydroxide structure-directing agent, and water, so as to obtain an aqueous suspension having the following molar composition (I):

$1 SiO_2 : y\ TAA_2O:\ z\ H_2O$ in which: $0.04 < y < 0.40$, $8 < z < 120$.

b) ageing between 1 h and 100 h the aqueous suspension from step a) at a temperature ranging from 10° C. to 50° C., so as to obtain a clear suspension;

c) heating for at least 30 min the clear suspension of step b) at a temperature ranging from 40° C. to 180° C.;

d) cooling the solution obtained at step c) to 20° C. and adding at least one source of alkali metal M' selected from a lithium, sodium, potassium, or caesium salt of a metal M, to obtain a gel having the molar composition (II):

$xM_nO_m : 1 SiO_2 : y\ TAA_2O : w\ M'_2O : z\ H_2O$

In which: the M'/M ratio varies from 0.1 to 4

$0.04<y<0.40$,
$8<z<120$,
$0.0004<x<0.15$,
$0.0004<w<0.30$,
n is an integer equal to 1 or 2, and
m is an integer and $1<m<6$;

e) ageing said gel obtained at step d) at a temperature ranging from 10° C. to 35° C. for at least 30 min
f) heating the solution obtained at step e) at a temperature ranging from 40° C. to 180° C., for at least 30 min
g) separating the solid from said liquid obtained at step f)
h) calcining said solid obtained at step g) in a sealed bottle with a relative humidity of 50 to 80% to obtain said synthetic zeolite material.

2. The method according to claim 1, characterized in that the source of the alkali metal M' is a sodium or a potassium salt of the metal M.

3. The method according to claim 1, characterized in that the silicon to metal M molar ratio Si/M is ranging from 179 to 65440 as determined by inductively coupled plasma optical emission spectrometry.

4. The method according to claim 1, characterized in that said synthetic zeolite material has an MFI-, BEA-, or FAU-framework type.

5. The method according to claim 1, characterized in that said synthetic zeolite material has a $\{^1H\}$ $^{29}Si$ CP MAS NMR with no peak.

6. The method according claim 1, characterized in that said synthetic zeolite material has a form of monodispersed single nanocrystals having a size ranging from 10 to 800 nm.

7. The method according to claim 1, characterized in that said metal M is selected from W, V, Mo, Sn, Zr, Co, Ni, Cu, Ti, In and Zn or any mixture thereof.

8. The method according to claims 1, characterized in that the source of silicon is selected from silica hydrogel, silicic acid, colloidal silica, fumed silica, tetraalkyl orthosilicates, silica hydroxides, precipitated silica and sodium silicates.

9. The method according to claim 1, characterized in that the source of M and M' is $Na_2WO_4.2H_2O$, $K_2WO_4$, $NaVO_3$, $KVO_3$, $Na_2MoO_4.2H_2O$, $K_2MoO_4$, $Na_2SnO_3.3H_2O$, $K_2SnO_3.3H_2O$, $Na_2ZrO_3$, $K_2ZrO_3$ or any mixture thereof.

10. The method according to claims 1, characterized in that the tetraalkylammonium hydroxide structure-directing agent is tetraethylammonium hydroxide, tetrabutylammonium hydroxide or tetrapropylammonium hydroxide.

11. The method according to claim 1, characterized in that the synthetic zeolite material has a silicon to metal M molar ratio Si/M of at most 1800.

12. The method according to claim 1, characterized in that the step h) is carried out at a temperature ranging from 400° C. to 800° C. under an air, oxygen or inert atmosphere; and/or the step e) is carried out under stirring.

13. The method according to claim 1, characterized in that the step b) is performed at a temperature ranging from 10 to 35° C. and/or is carried out under stirring.

14. The method according to claim 1, characterized in that the step c) and/or step f) is performed at a temperature ranging from 60° C. to 120° C. and/or is performed for at most 48h.

15. The method according to claim 1, characterized in that the synthetic zeolite material has a specific surface area ranging from 300 to 500 $m^2/g$ measured according to the BET method ASTM D3663-03 and/or a pore volume of about 0.2 to 0.7 $cm^3/g$ measured according to the BET method ASTM D3663-03, and/or an external surface area of about 20 to 190 $m^2/g$ measured according to the BET method ASTM D3663-03.

16. The method according to claim 1, characterized in that the synthetic zeolite material comprises particle size ranging from about 100 to 800 nm measured according to SEM.

17. The method according to claim 1, characterized in that the synthetic zeolite material comprises at most about 5% by mass of aggregates of nanocrystals, and/or polycrystalline agglomerates.

18. The method according to claim 1, characterized in that the synthetic zeolite material contains a metal M with a content of 0.1 to 1.5 wt. % at most, with respect to the total mass of the material measured according to EDS-TEM.

19. The method according to claim 1, characterized in that the gel obtained in said step d) has a pH ranging from 9 to 14.

20. The method according to claim 1, characterized in that for the molar composition (II) of step d), one or more of the following is true:
$0.2<y<0.3$; and/or
$20<z<50$; and/or
$0.01<x<0.1$; and/or
$0.01<w<0.2$.

\* \* \* \* \*